United States Patent
Asano et al.

(10) Patent No.: US 6,190,777 B1
(45) Date of Patent: Feb. 20, 2001

(54) ULTRAVIOLET ABSORBING MATERIAL AND ULTRAVIOLET ABSORBING PLATE

(75) Inventors: Tuyoshi Asano; Noboru Takaesu; Yoshinori Nishikitani, all of Yokohama; Masaki Minami, Kawasaki, all of (JP)

(73) Assignee: Nippon Mitsubishi Oil Corporation, Tokyo (JP)

( * ) Notice: Under 35 U.S.C. 154(b), the term of this patent shall be extended for 0 days.

(21) Appl. No.: 09/202,812

(22) PCT Filed: Jun. 27, 1997

(86) PCT No.: PCT/JP97/02240

§ 371 Date: Dec. 22, 1998

§ 102(e) Date: Dec. 22, 1998

(87) PCT Pub. No.: WO97/49778

PCT Pub. Date: Dec. 31, 1997

(30) Foreign Application Priority Data

| Jun. 27, 1996 | (JP) | 8-167116 |
| Jun. 28, 1996 | (JP) | 8-170100 |
| Jan. 23, 1997 | (JP) | 9-010468 |
| Jan. 23, 1997 | (JP) | 9-024333 |
| Jan. 23, 1997 | (JP) | 9-024334 |
| Jan. 23, 1997 | (JP) | 9-024335 |
| May 22, 1997 | (JP) | 9-132002 |

(51) Int. Cl.[7] .................. B32B 27/18; C03C 17/30; H01B 5/14

(52) U.S. Cl. .................. 428/447; 428/331; 428/429; 428/448; 428/451; 428/452; 548/110; 548/261; 554/39; 556/419

(58) Field of Search .................. 428/331, 429, 428/447, 448, 451, 452; 548/110, 261; 554/39; 556/419

(56) References Cited

FOREIGN PATENT DOCUMENTS

| 61-2103 | 1/1986 | (JP) . |
| 61-54800 | 11/1986 | (JP) . |
| 62-262002 | * 11/1987 | (JP) . |
| 1-238592 | 9/1989 | (JP) . |
| 2-117928 | 5/1990 | (JP) . |
| 2-248412 | 10/1990 | (JP) . |
| 3-98021 | * 4/1991 | (JP) . |
| 3-45094 | 7/1991 | (JP) . |
| 5-117545 | 5/1993 | (JP) . |
| 5-339033 | 12/1993 | (JP) . |
| 5-345639 | 12/1993 | (JP) . |
| 06056466 | 3/1994 | (JP) . |
| 06088064 | 3/1994 | (JP) . |
| 6-87189 | 3/1994 | (JP) . |
| 06145387 | 5/1994 | (JP) . |
| 7-309629 | 11/1995 | (JP) . |
| 8-245944 | 9/1996 | (JP) . |
| 8-271872 | 10/1996 | (JP) . |
| 8-295845 | 11/1996 | (JP) . |
| 9-143404 | 6/1997 | (JP) . |

* cited by examiner

Primary Examiner—D. S. Nakarani
(74) Attorney, Agent, or Firm—Akin, Gump, Strauss, Hauer & Feld, L.L.P.

(57) ABSTRACT

An ultraviolet absorbing material prepared by reacting (a) an aminosilane compound of general formula (1) or a derivative thereof wherein $R^1$ is $C_1$–$C_{10}$ alkylene or —$(CH_2)_m$—NH— (wherein m is an integer of 1 to 4); $R^2$3 s are each independently hydrogen, hydroxyl, halogeno, $C_1$–$C_{10}$ alkyl or $C_1$–$C_{10}$ alkoxy, with the proviso that at least one of $R^2$ is $C_1$–$C_{10}$ alkoxy; and n is an integer of 0 or above with (b) an ultraviolet absorber having a carboxyl group in the molecule in such a way as to form an amide linkage resulting from the above aminosilane compound or derivative thereof. This material can form an ultraviolet absorbing layer and is favorably applicable to ultraviolet-absorbing glass (ultraviolet absorbing plate), optical devices and light modulators.

11 Claims, 6 Drawing Sheets

ULTRAVIOLET ABSORBING MATERIAL AND ULTRAVIOLET ABSORBING PLATE

TECHNICAL FIELD

Generally, there have been employed two methods for providing a substrate such as a glass sheet with ultraviolet absorbing properties, one of which to coat a substrate with an ultraviolet absorbing material and the other of which to utilize multi-reflections of a multilayer. The latter is excellent in free adjustability of wavelength to be shielded and capability of clear-cutting, but has a problem relating to cost due to the complicated production processes. In the former method, there may be used an inorganic or organic ultraviolet absorber.

Inorganic ultraviolet absorbers as disclosed in Japanese Patent Laid-Open Nos. 5-339033, 5-345639 and 6-56466 are excellent in resistance to weathering and resistance to heat but are disadvantageous because these absorbers are less selective because the wavelength of ultraviolet to be absorbed is determined by the band gap of a compound forming the absorbers and none of these can cut off ultraviolet rays of wavelengths of neighborhood of 400 nm. Furthermore, most of the absorbers are involved with unexpected coloration upon interception of ultraviolet rays of longer wavelength.

On the contrary, organic ultraviolet absorbers are broad in range of absorptivity and thus can absorb ultraviolet in a wide range of wavelengths by selecting the type, concentration and thickness of the absorbers. As a result of extensive research directed to a system having such organic ultraviolet absorbers, it has now been found that use of an absorber which has a maximum absorption wavelength in a longer wavelength region or which is increased in concentration or in layer thickness is conducive to intercept ultraviolet in a longer wavelength region. However, such an absorber having the maximum absorption wavelength in a longer wavelength region as disclosed in Japanese Laid-Open Publication No. 6-145387 is poor in resistance to a light and reduced in absorbing power with the lapse of time. This absorber also has a problem that the permeability is easily deteriorated due to use of a fluorescent bleach.

A benzophenic- or benzotriazolic absorber is relatively good in resistance to a light and capable of absorbing ultraviolet rays in a relatively longer wavelength by increasing the concentration and the layer thickness. However, in the case of coating these absorbers mixed with a resin over a substrate, the layer formed thereover is limited in thickness to an extent of several tens of micrometers. However, with the layer of the mixture in this order of thickness, it is necessary to add the absorbers in a considerably high concentration. Still, the mere addition of the absorbers in a high concentration leads to problems involving deposition thereof and bleedout due to the use over an extended period of time.

It has been attempted for solving these problems to react an absorber with a resin in which instance the absorber is copolymerized with an acrylic resin, as disclosed in Japanese Patent Laid Open Publication Nos. 2-248412 and 6-88064. However, since the acrylic resin per se has a drawback in resistance to weathering and heat, the resulting ultraviolet absorber can not bear to be used over a prolonged length of time. Alternatively, various researches have been made on the possibility of using an ultraviolet absorber which is reactive a silicone resin excelled in resistance to weathering and resistance to heat as disclosed in Japanese Patent Laid-Open Publication No. 61-54800, 2-117928 and 3-45094. It, however, has been found that most of such absorbers have a difficulty in synthesis in technical view and a problem in durability.

An object of the present invention is to provide an ultraviolet absorbing material which is easy for synthesis and free from bleedout of the ultraviolet absorber even after use of a prolonged period of time and from the foregoing deficiencies even in the case where a long wavelength interception can be achieved in the presence of the absorber in a high concentration. Another object of the present invention is to provide an ultraviolet absorbing plate which is excellent in resistance to weathering as well as resistance to heat, free from bleed out after being used for an extended period of time and capable of intercepting ultraviolet rays in a longer wavelength region without reducing transmittance of ultraviolet in a visible region. Disclosure of the Invention According to the invention, there is provided an ultraviolet absorbing material comprising a reaction product of (a) an aminosilane compound of formula (1) or the derivative thereof with (b) an ultraviolet absorber having in its molecules a carboxyl group so as to form amide bonds derived from the aminosilane compound or the derivative thereof, formula (1) being represented by

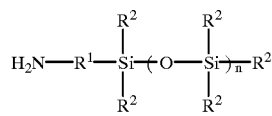

(1)

wherein $R^1$ is a $C_1$–$C_{10}$ alkylene group or a divalent group of the formula —$(CH_2)m$—NH— in which m is an integer of 1–4, $R^2$ may be the same or different and each are selected from the group consisting of a hydrogen atom, a hydroxyl group, a halogen atom, a $C_1$–$C_{10}$ alkyl group and a $C_1$–$C_{10}$ alkoxy group provided that at least one of $R^2$ is an alkoxy group, and n is an integer of 0 or greater.

An ultraviolet absorbing plate according to the invention is produced by forming the ultraviolet absorbing layer of an ultraviolet absorbing material having an amide bond and an Si—O bond, on a substrate.

The ultraviolet absorbing material comprises preferably a reaction product of (a) an aminosilane compound of formula (1) or the derivative thereof with (b) an ultraviolet absorber having in its molecules a carboxyl group so as to form amide bonds derived from the aminosilane compound or the derivative thereof, formula (1) being represented by

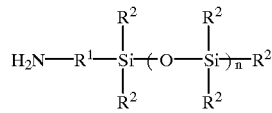

(1)

wherein $R^1$ is a $C_1$–$C_{10}$ alkylene group or a divalent group of the formula —$(CH_2)m$—NH— in which m is an integer of 1–4, $R^2$ may be the same or different and each are selected from the group consisting of a hydrogen atom, a hydroxyl group, a halogen atom, a $C_1$–$C_{10}$ alkyl group and a $C_1$–$C_{10}$ alkoxy group provided that at least one of $R^2$ is an alkoxy group, and n is an integer of 0 or greater.

The reaction between the aminosilane compound or the derivative and the ultraviolet absorber having in its molecule a carboxyl group is preferably conducted in the presence of a silicone resin or is conducted, followed by addition of a silicone resin upon completion of the reaction.

The ultraviolet absorbing material is preferably produced by reacting (a) an aminosilane compound of formula (1) or the derivative thereof with (b) an ultraviolet absorber having in its molecules a carboxyl group in the presence of a silane compound having an epoxy group and/or a colloidal silica so as to form an amide bond derived from the aminosilane compound or by adding a silane compound having an epoxy group and/or a colloidal silica to a reaction product obtained by reacting (a) an aminosilane compound of formula (1) or the derivative thereof with (b) an ultraviolet absorber having in its molecules a carboxyl group so as to form an amide bond derived from the aminosilane compound, formula (1) being represented by

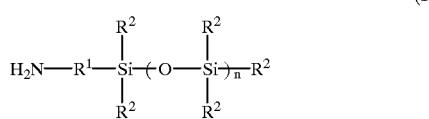

(1)

wherein $R^1$ is a $C_1$–$C_{10}$ alkylene group or a divalent group of the formula —$(CH_2)m$—$NH$— in which m is an integer of 1–4, $R^2$ may be the same or different and each are selected from the group consisting of a hydrogen atom, a hydroxyl group, a halogen atom, a $C_1$–$C_{10}$ alkyl group and a $C_1$–$C_{10}$ alkoxy group provided that at least one of $R^2$ is an alkoxy group, and n is an integer of 0 or greater.

The substrate is preferably transparent and the ultraviolet absorbing layer is also preferably transparent.

The substrate preferably comprises a plurality of transparent substrates laminated one after another and one or more the ultraviolet absorbing layers interposed therebetween.

An overcoat layer is preferably coated over the ultraviolet absorbing layer.

The substrate has preferably a transparent electrically conductive layer on the side where the ultraviolet absorbing layer is disposed.

An overcoat layer is preferably disposed between the ultraviolet absorbing layer and the transparent electrically conductive layer.

BEST MODE FOR CARRYING OUT THE INVENTION

Figure 1:
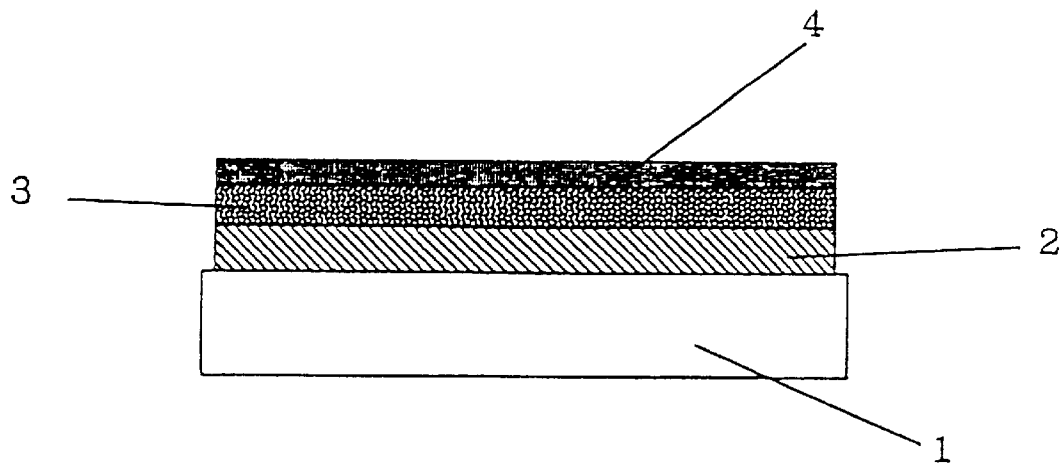
FIG. 1 is a schematic cross-sectional view showing one example of the ultraviolet absorbing layer according to the invention.

A substrate used for the present invention may be a transparent or opaque substrate and may be a laminate of these substrates.

There is no particular limitation imposed on the transparent substrate. The transparent substrate may be a colorless or colored glass, a camphor glass, a wire glass, a hot wire reflection glass, a hot wire absorbing glass, a reinforced glass, a glass block or a colorless or colored transparent resin. Such transparent glasses may be polyethylene terephthalate, polyamide, polysulfone, polyethersulfone, polyetherketone, polyphenylene sulfide, polycarbonate, polyimide, polymethylmethacrylate and polystyrene.

The term "transparent" used herein designates visible optical transmission ranging from 3–100%, preferably 10–100%. The substrate used for the invention has necessarily a smooth surface which may be planner or curved at normal temperature and may be deformable under stress and be in a vessel-like shape.

There is no particular limitation imposed on the material of the opaque substrate. Therefore, eligible materials may be selected from a variety of glasses such as a soda-lime glass and a borosilicate glass, a synthetic resin, papers, woods, woven textiles, unwoven textiles, knits and a composite material of two or more of these materials. Eligible synthetic resins are polyethylene terephthalate, polyamide, polysulfone, polyether sulfone, polyphenylene sulfide, polycarbonate, polyimide, polymethyl methacrylate and polystyrene. The opaque substrate may be white or colored.

The term "opaque" used herein means that visible light can not be transmitted. The opaque substrate used for the present invention has desirously an optical transmittance of less than 3%, preferably less than 2% at a thickness of 2μm. The opaque substrate used for the invention has macroscopically a surface, which may not be flat in microscopic view and may be curved and deformable under stress.

The ultraviolet absorbing layer has necessarily an amide bond represented by (—CONH—) and an Si—O bond. Preferably these bonds are attached to some bonding groups such as (a) a $C_1$–$C_5$ alkylene group, (b) a divalent group represented by the formula —$(CH_2)m$—$NH$— wherein m is an integer of 1–4, and (c) a residue derived from (a) or (b).

The contents of the Si—O bond in the ultraviolet absorbing layer should be in an amount of 1–50 mol, preferably 1–30 mol, more preferably 1–15 mol per mol of the amide bond.

Figure 12:
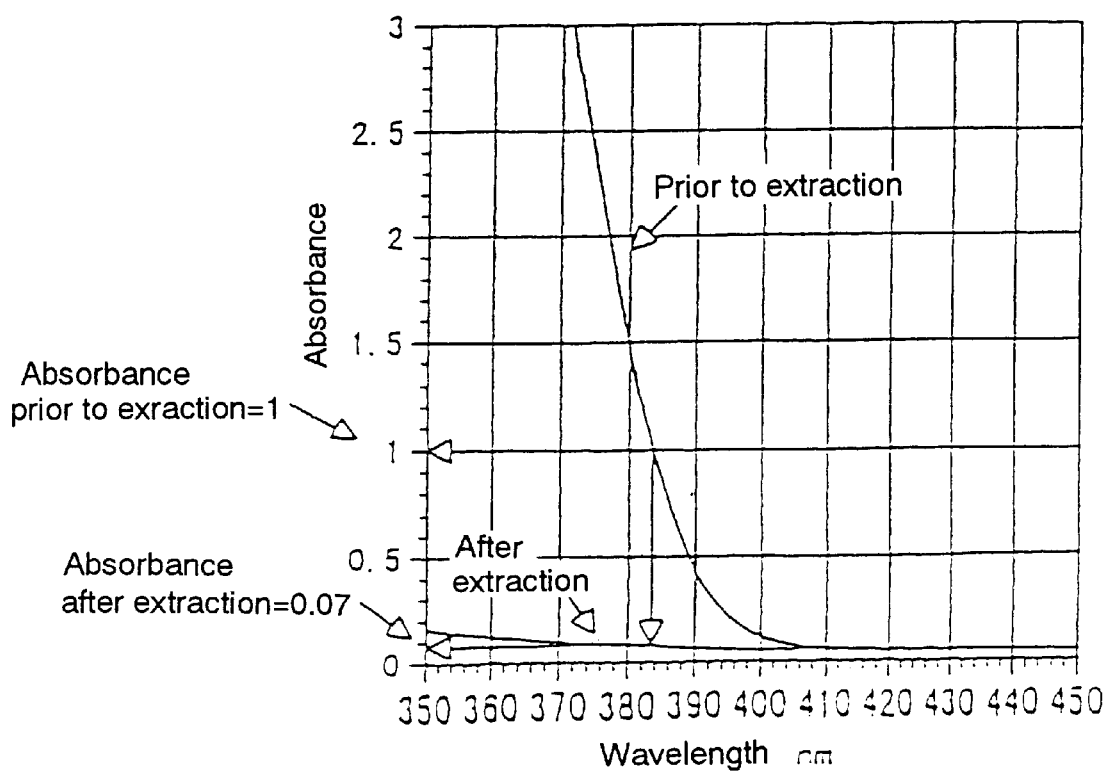
FIG. 12 is a model graph demonstratively explaining the principle of the way of determining a change rate in ultraviolet absorbing power.

The ultraviolet absorbing plate comprises preferably an ultraviolet absorbing plate comprising a transparent substrate and an ultraviolet absorbing layer which is less than 40%, preferably less than 30%, more preferably less than 15% in a change rate in ultraviolet absorbing power of an ultraviolet after the plate being subjected to 24 hour-extraction in a boiled acetone, which change rate is defined by the following mathematical formula:

Change Rate in Ultraviolet Absorbing Power (%)=(Absorbance prior to extraction)−(Absorbance after extraction)×100 (Absorbance prior to extraction)

provided that the calculation is carried out using the value of absorbance after extraction at an arbitrary wavelength region corresponding to that at which absorbance prior to extraction is substantially 1. Changes in ultraviolet absorbing power can be easily observed from an ultraviolet absorbing spectrum. Take for instance, in FIG. 12 there is demonstratively shown the principle of the way of determining change rate in ultraviolet absorbing power and it is clear therefrom that the wavelength is about 383 nm when the absorbance prior to extraction is 1 and the absorbance after extraction is 0.07 at the same wavelength. Therefore, the change rate in ultraviolet absorbing power is calculated to be 93%.

Change in ultraviolet absorbing power results from elusion of a component derived from an ultraviolet absorbing compound (usually an organic ultraviolet absorbing compound) forming an ultraviolet absorbing layer, into acetone. However, the ultraviolet absorbing component is substantially free from such elution if it is chemically bonded to another component in the ultraviolet absorbing layer.

In the case of using an organic ultraviolet absorber having a benzotriazole skeleton or a benzophenon skeleton described hereinafter in details as an ultraviolet absorbing compound, the ultraviolet absorbing layer thus obtained has usually the benzotriazole or benzophenon skeleton or the structure derived therefrom. However, in the present invention, owing to the ultraviolet absorbing compound in the ultraviolet absorbing layer bonded through the amide bond to the matrix, the ultraviolet absorbing layer boiled in acetone exhibits no or slight extraction of the structure derived from the ultraviolet absorber thereof. Therefore, the resulting ultraviolet absorbing plate is less in change rate in ultraviolet absorbing power than the above-specified values thereby obtaining a very little change rate.

As no particular limitation is imposed on the production method of such a particular ultraviolet absorbing layer, any suitable methods can be employed. One of the methods is exemplified as follows:

An aminosilane compound represented by formula (1) given below or the derivative thereof hereinafter referred to as Component A is reacted with an ultraviolet absorber having in its molecule a carboxyl group referred hereinafter to as Component B so as to form an amide bond derived from Component A thereby producing an ultraviolet absorbing material which is coated and cured on a substrate;

formula (1) being represented by

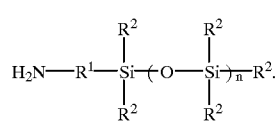

(1)

In formula (1), $R^1$ is a $C_1$–$C_{10}$, preferably $C_1$–$C_5$ alkylene group or a divalent group of the formula —$(CH_2)_m$—NH— wherein m is an integer of 1–4. Such an alkylene group for $R^1$ may be methylene, ethylene, trimethylene and propylene. $R^2$ in formula (1) may be the same or different and each are a hydrogen atom, a hydroxyl group, a $C_1$–$C_{10}$, preferably $C_1$–$C_3$ alkyl group, a $C_1$–$C_{10}$, preferably $C_1$–$C_5$ alkoxy group and a $C_6$–$C_{10}$, preferably $C_6$–$C_8$ aryl group. At least one of $R^2$ is preferably a $C_1$–$C_5$ alkoxy group. Specific examples of the alkyl groups for $R^2$ are methyl, ethyl, propyl and i-propyl groups. Preferred alkoxy groups for $R^2$ are methoxy, ethoxy, propoxy and i-propoxy groups while preferred aryl groups are phenyl and tolyl groups. n is an integer of greater than 0, preferably between 0 and 3.

Preferred examples of the aminosilane compound of formula (1) are 3-aminopropyltriethoxysilane, 3-aminopropyidiisopropylethoxysilane, 3-aminopropylmethyldiethoxysilane, 3-aminopropylpolydimethylsiloxane, N-(2-aminoethyl)-3-aminopropyltrimethoxysilane and 3-aminopropyltris(methoxyethoxy)silane. Preferred examples of the derivatives of the aminosilane compound are hydrolysates of the above preferred compounds.

These aminosilane compounds and derivatives thereof may be prepared by a conventional method.

Preferred examples of the ultraviolet absorbing material (Component B) having in its molecule a carboxyl group are compounds having one or more of a carboxyl group at the side chain in the molecule, preferably organic compounds and compounds having a benzotriazole skeleton or a benzophenon skeleton.

Preferred compounds having a benzotriazole skeleton are those represented by the formula

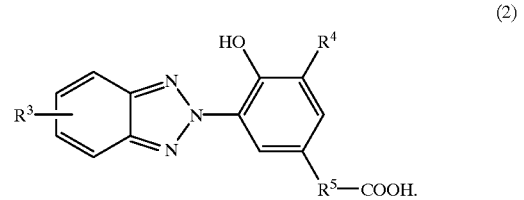

(2)

In formula (2), $R^3$ is a hydrogen atom, a halogen atom and a $C_1$–$C_{10}$, preferably $C_1$–$C_6$ alkyl group. The halogen atom for $R^3$ includes fluorine, chlorine, bromine and iodine, while the alkyl group includes methyl, ethyl, propyl, i-propyl, butyl, t-butyl and cyclohexyl groups. $R^3$ is substituted at the 4- or 5- position of the benzotriazole skeleton, while the halogen atom and the alkyl group are usually located at the 4-position. $R^4$ is a hydrogen atom or a $C_1$–$C_{10}$, preferably $C_1$–$C_6$ alkyl group. Preferred examples of the alkyl group are methyl, ethyl, propyl, i-propyl, butyl, t-butyl and cyclohexyl groups. $R^5$ is a $C_1$–$C_{10}$, preferably alkylene group or alkylidene group. Preferred examples of the alkylene group are methylene, ethylene, trimethylene and propylene groups, while preferred alkylidene are ethyliden and propylidene.

Specific examples of the compound of formula (2) are 3-(5-chloro-2H-benzotriazole-2-yl)-5-(1,1-dimethylethyl)-4-hydroxybenzene propanoic acid,
3-(2H-benzotriazole-2-yl)-4hydroxy benzene ethanoic acid and
3-(5-methyl-2H-benzotriazole-2-yl)-5-(1-methylethyl)-4-hydroxybenzene propanoic acid.

Preferred compounds having the benzophenone skelton are benzophenone-based compounds represented by the following formulae;

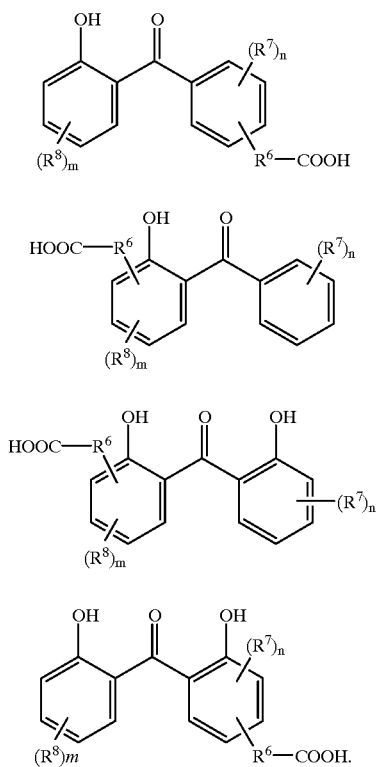

(3)

(4)

(5)

(6)

In the formulae, $R^7$ and $R^8$ may be the same or different and each are a hydroxyl group or a $C_1$–$C_{10}$, preferably $C_1$–$C_6$ alkyl or alkoxy group. n and m each are an integer ranging from 0 to 3. Specific examples of the alkyl group are methyl, ethyl, propyl, i-propyl, butyl, t-butyl and cyclohexyl groups. Specific examples of the alkoxy group are methoxy, ethoxy, propoxy, i-propoxy and butoxy groups. $R^6$ is a $C_1$–$C_{10}$, preferably $C_1$–$C_3$ alkylene or alkylidene group. Specific examples of the alkylene group are methylene, ethylene, trimethylene and propylene groups. Specific examples of the alkylidene groups are ethylidene and propylidene groups.

Preferred examples of the compound having the benzophenone skeleton include 2-hydroxy-4-methoxybenzophenone-5-carbocylic acid, 2,2'-dihydroxy-4-methoxybenzophenone-5-carboxylic acid and 4-(2-hydroxybenzoyl)-3-hydroxybenzene propanoic acid.

The ultraviolet absorber having the benzotriazole skeleton or the benzophenone skeleton may be prepared in a conventional manner.

In the present invention, eligible ultraviolet absorbing material to be formed into an ultraviolet absorbing layer having an amide bond and an Si—O bond onto a substrate includes a component obtained by at least reacting Component A and Component B so as to form an amide bond derived from Component A. Dehydration is generally employed for the reaction of Component A and Component B. No particular limitation is imposed on the amount of the amide bond to be formed. Generally, Components A and B are reacted so that the amide bond is formed in an amount of 100 mol percent of the aminosilane of Component A. However, less than 100 mol percent is still acceptable. The lower limit is on the order of 50 mol percent.

The inventive ultraviolet absorbing material may contain optional components in addition to Components A and B to an extent that an accomplishment of the object of the invention is not hindered. The optional components may be added during or after the reaction between Components A and B. Hereinbelow, these optional components are described in details.

One example of such optional components is exemplified by silicone resins (hereinafter referred to as Component C). Component C is preferably a reactive silicone resin having a functional group which is reactive with the alkoxysilyl group of Component A by dehydration and/or removing an alcohol. Preferred functional groups are an alkoxysilyl group and a silanol group.

Such a reactive silicone resin can be readily synthesized by subjecting alkoxysilanes or chlorosilanes to partial hydrolysis and then condensation. Commercially available reactive resins are pure silicone varnishes as manufactured by Okitsumo Co., Ltd. under the trade name of "X07931-Clear", silicone resins as manufactured by Tore. Dow-Corning Silicone Co., Ltd. under the trade name of "SR2410" and acrylyl-modified silicone resins as manufactured by Chisso Co., Ltd. under the trade name of "Sairacoat 1000". These silicone resins may be put in use in the form of a solution by using a variety of solvents to an extent that an accomplishment of the objection of the invention does not hindered. Although not restricted, such solvents are a variety of hydrocarbon-based solvents, ketones, ethers, esters and etheresters. Alternatively, a variety of modified silicone resins are also eligible.

Component C may be co-existed during or after the reaction of Component A with Component B, the former being particularly preferred.

Another example of the optional component is a variety of epoxy silanes (hereinafter referred to as Component D) having in their molecule an epoxy group. Preferred epoxy silanes are those represented by the following formulae

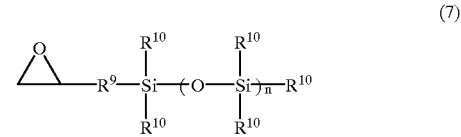

(7)

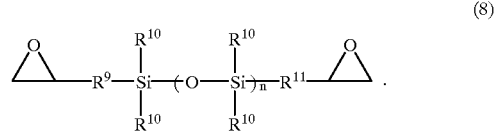

(8)

In the formulae, $R^9$ and $R^{11}$ may be the same or different and each are a $C_1$–$C_{10}$, preferably $C_1$–$C_5$ alkylene group or a divalent group represented by the formula —R—O R'— wherein R and R' each are a $C_1$–$C_{10}$, preferably $C_1$–$C_5$ alkylene group, $R^{10}$ may be the same or different and each are a hydrogen atom, a hydroxyl group, a $C_1$–$C_{10}$, preferably $C_1$–$C_5$ alkyl or alkoxy group or a $C_6$–$C_{10}$, preferably $C_6$–$C_8$ aryl group provided that at least one of $R^{10}$ is an alkoxy group, preferably a $C_1$–$C_5$ alkoxy group and n is an integer of greater than 0, preferably between 0 and 3.

Preferred examples of the alkylene group are methylene, trimethylene groups. Preferred examples of the alkyl group are methyl, ethyl, propyl, i-propyl, butyl, t-butyl, pentyl, hexyl, heptyl and octyl groups. Preferred examples of the alkoxy group are methoxy, ethoxy, propoxy, butoxy, t-butoxy, pentyloxy and hexyloxy groups. Preferred examples of the aryl group are phenyl and tolyl groups.

Preferred examples of Component D are
3-glycidoxypropyltrimethoxysilane,
dimethoxy-3-glycidoxypropylmethylsilane,
2-(3,4-epoxycyclohexylethyl)trimethoxysilane,
dimethylethoxy-3-glycidoxypropylsilane, 1,3-bis(3-glycidopropyl)-1,3-dimethyl-1,3-dimethoxydisiloxane and mixtures thereof.

Component D may be hydrolyzed before put in use. Alternatively, Component D may be put in use after the epoxy group thereof being subjected to ring-open polymerization with use of a suitable polymerization catalyst. Preferred polymerization catalysts are Lewis acid catalyst such as boron trifluoride, diethylether complex, aluminum chloride and diethyl zinc. No particular limitation is imposed on the ring-open polymerization conditions. The polymerization temperature may be in the range of between −80 and 130° C., preferably −20 and 80° C. and the reaction time may be selected depending upon the conditions and mode of the reaction but usually in the range between 10 minutes and 10 hours, preferably 1 hour and 6 hours. Although not restricted, the solvent used for this reaction may be an aromatic hydrocarbon such as toluene and xylene, ketones and esters.

Although Component D may be co-existed with Components A and B during or after the reaction therebetween, the latter is preferred. In the case of using Component D having the epoxy group having been polymerized to open the ring thereof, it is preferably added upon the reaction of Components A and B.

Still another example of the optional component is a polyether-modified polysiloxane (hereinafter referred to as Component E) and preferably represented by the formula (9)

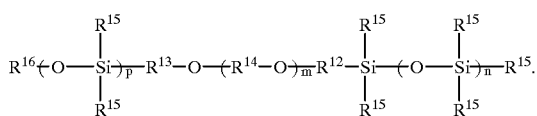

In the formula, $R^{12}$, $R^{13}$ and $R^{14}$ may be the same or different and each are a $C_1$–$C_{10}$, preferably $C_1$–$C_5$ alkylene groups, $R^{15}$ may be the same or different and each are a hydrogen atom, a hydroxyl group, a $C_1$–$C_{10}$, preferably $C_1$–$C_5$ alkyl and alkoxy group or a $C_{6-10}$, preferably $C_{6-8}$ aryl group. Preferably at least one of $R^{15}$ is a $C_1$–$C_{10}$ alkoxy group. m is an integer of greater than 0, preferably between 1 and 100. n is an integer of greater than 0, preferably between 0 and 10. p is an integer of greater than 0, preferably between 0 and 10.

The alkylene group exemplarily includes methylene, trimethylene, and tetramethylene groups. The alkyl group exemplarily includes methyl, ethyl, propyl, i-propyl, butyl, t-butyl, pentyl, hexyl, heptyl and octyl groups. The alkoxy group exemplarily includes methoxy, ethoxy, propoxy, butoxy, t-butoxy, pentyloxy and hexyloxy. The aryl group exemplarily includes phenyl and tolyl groups.

Component E of formula (9) exemplarily includes tetraethyleneglycol-bis(triethoxysilylethyl)ether, polyethyleneglycol-bis(triethoxysilylethyl)ether, polypropyleneglycol-bis(triethoxysilylethyl)ether and mixtures thereof. Component E may be hydrolyzed before put in use.

Although Component E may be co-existed with Components A and B during or after the reaction therebetween, the former is preferred.

Particularly, the use of the optional components such as Component D of epoxysilanes and Component E of polyether-modified polysiloxanes is contributive to making the resulting ultraviolet absorbing layer to exert excellent performances such as improved adhesivity to a substrate without marring heat resistance and rigidity even with the thickness increased.

The other example of the optional component is an inorganic fine dispersion (referred hereinafter to as Component F). Although not restricted, Component F exemplarily includes dispersions of fine particles such as silica, alumina, titanium oxide and antimony oxide.

The fine particles are on the order of 1–100 nm in particle size. The dispersion medium may be water, methanol, xylene and methylethyl ketone. Among commercial products, preferred are "LUDOX" manufactured by Dupont and "XBA-ST" manufactured by Nissan Chemical Co. Ltd.

Although Component F may be co-existed with Components A and B during or after the reaction therebetween, the former is preferred.

Each of the above-mentioned optional components may be prepared by a conventional method.

The inventive ultraviolet absorbing material to be formed into the above-specified ultraviolet absorbing layer on a substrate may be prepared by reacting Components A and B solely or in the presence of the above-described optional components as needed or reacting Components A and B and thereafter adding the optional components. There is no particular limitation imposed on the reaction conditions as long as an amide bond derived from Component A is formed. Generally, Component A is mixed with Component B and optionally another component in a solvent, followed by the reaction at a temperature ranging from room temperature to 350° C., preferably 60 to 250° C., for 5 minutes to 50 hours, preferably 10 minutes to 200 hours. The reaction may be repeated.

The solvent used for this reaction is not restricted as long as it does not bother the accomplishment of the purpose of the invention. However, preferred are an aromatic solvent such as toluene and xylene, a ketone-based solvent such as cyclohexanone and a mixture thereof.

No particular limitation is imposed on the ratio between Components A and B upon the reaction. The amount of Component B may be selected from the ranges between 5–90, preferably 10–80 mass percent based on the total mass of Components A and B.

When the optional components are used for the reaction or added after the reaction, no particular limitation is imposed on the amount of each of the optional components. However, the above-mentioned silicone resin (Component C) may be used in an amount of 5–300, preferably 20–150 mass percent based on the total mass of Components A and B. The above-mentioned epoxysilanes (Component D) may be used in an amount of 10–500, preferably 100–400 mass percent based on the total mass of Components A and B. The above-mentioned polyehter-modified polysiloxanes (Component E) may be used in an amount of 100–500, more preferably 100–400 mass percent based on the total mass of Components A and B. The above-mentioned inorganic fine particles dispersions may be used in an amount of 5–400, preferably 10–200 mass percent based on the total mass of Components A and B.

The ultraviolet absorbing material thus obtained may be applied on a substrate as a coating component immediately after completion of the above-described reaction or after being added with the optional components. Alternatively, the resulting coating component may be coated after being added with another variety of optional components.

Such components exemplarily include various types of antioxidants, a quencher, a free-radical capturing agent, an inorganic or organic acid such as hydrochloric acid, sulfuric acid and acetic acid, a Lewis acid such as a boron trifluoride, diethylether complex and sodium antimony acid hexafluoride, a base such as potassium hydroxide, sodium hydroxide, triethylamine and aniline, a catalyst having a curing acceleration effect (to be preferably used in an amount of 0.1–5.0 mass percent based on the ultraviolet absorbing material) such as an organic metal including dibutyltin dilaurate and titanium tetraiso propoxide and a solvent such as toluene, xylene, ethanol, isopropanol, thinner, dimethylformamide, cyclohexane and 1-methoxy-2-acetoxypropane.

The inventive ultraviolet absorbing layer may be formed by coating the ultraviolet absorbing material on a substrate and then curing the same.

The ultraviolet absorbing material prior to be coated is usually in a liquid state. Therefore, any suitable conventional coating methods may be employed such as spin coating, spray coating, cast coating, blade coating, dip coating and flow coating.

The curing reaction may be conducted at a temperature between room temperature and 250° C., preferably 60 and 250° C. if using the aforementioned catalyst having an acceleration effect. Without the catalyst, the ultraviolet absorbing material can be cured at a temperature between room temperature and 350° C., preferably 60 and 250° C. The curing reaction may be carried out usually for 10 minutes to 5 hours.

Although not restricted, the ultraviolet absorbing layer formed on a substrate may have a thickness in the range of usually 0.5–50 µm. Less than 0.5 µm would fail to attain a suffice ultraviolet shielding effect, while greater than 50 µm would lead to a difficulty in coating due to cracking.

By the methods and components as described above, there can be produced an ultraviolet absorbing plate comprising an ultraviolet absorbing layer having an Si—O bond and formed on a substrate.

The ultraviolet absorbing plate according to the invention is capable of shielding almost completely or completely transmitting lights in an ultraviolet region of 300–400 nm. More specifically, the ultraviolet absorbing plate can shield more than 95% of transmitting lights in the ultraviolet region. More over, more than 98% and more than 99% of transmitting lights in an ultraviolet region can be shielded with a preferred embodiment and more preferred embodiment of the inventive ultraviolet absorbing plate, respectively.

In the present invention, the ultraviolet absorbing layer is substantially transparent and preferably is almost or completely free from a reduction in transmission in visible light ranges peculiar to a substrate at all. The final ultraviolet absorbing plate is preferably transparent.

The inventive ultraviolet absorbing plate comprises at least a substrate and an ultraviolet absorbing layer but may have an overcoat layer over the ultraviolet absorbing layer thereby providing functions such as resistance to wear and chemicals.

Although not restricted, preferred materials for the overcoat layer are resins excelled in resistance to heat. Specific examples of such resins include a silicone resin such as polyimide, polyamide, polycarbonate, polyarylate, polyethersulfone, melamine resin, phenol resin, epoxy resin and silicone varnish and a urea resin, among which the silicone resins are particularly preferred. These may be used in combination with a glass filler or an inorganic powdery material. Eligible inorganic powdery materials are powders of ZnO, $TiO_2$, $CeO_2$ or silica. Eligible silicone resins are those having inorganic fine particles such as colloidal silica dispersed therein, partially hydrolyzed products or partially condensed products of silanes such as alkoxysilane and chlorosilane. Specific examples of the silicone silane which are commercially available are "Tossguard 510" manufactured by Tohsiba Silicone, "APZ7703" and "APZ7705" manufactured by Nihon Unicar and polysllazane manufactured by Tohnen under the trade name of N-L110 and N-L710. A partially hydrolyzed product of epoxysilane is also known as a suitable overcoat material which is excelled in resistance to wear. Although not restricted to the method for forming the overcoat layer and thus an suitable method can be employed, the overcoat layer is generally formed by coating a solution of the resins or the precursor thereof. After coating, a suitable treatment may be applied slectively depending upon the nature of the resin. Alternatively, an overcoat layer can be formed by applying a film of the above-described resin.

For example, a silicone varnish is added with a catalyst such as dibutyltin dilaurate and coated over the ultraviolet absorbing layer, followed by heat-curing at a temperature of 100–200° C. for 5 minutes to 2 hours thereby obtaining an overcoat layer having a thickness of 1–20 µm. Alternatively, if using an acryl-melamine resin precursor, it is coated and then cured at a temperature of 130–190° C. for 5 minutes to 2 hours thereby obtaining an overcoat layer having a thickness of 10–100 µm. Further alternatively, if using a photocurable type acryl based resin precursor, it is coated and then placed under irradiation from a high-tension mercury vapor lamp thereby obtaining an overcoat layer having a thickness of 1–10 µm within 5 minutes.

The coating may be conducted by a known method for which instance spin coating, spray coating, blade coating and dip coating. Alternatively, prior to forming an overcoat layer, the coatability and adhesivity to an ultraviolet absorbing layer can be improved by optical surface modification and primary coating treatments.

The inventive ultraviolet absorbing plate may have over the overcoat layer a film of metal oxides possessing heat wave reflection and insulating functions. The film can be formed by a sputtering method or a solgel method thereby providing the ultraviolet absorbing plate with functions such as heat wave reflection and insulation.

The inventive ultraviolet absorbing plate is characterized by its capability of shielding ultraviolet rays in longer wavelength regions, compared with conventional ones. Although not restricted, the inventive ultraviolet absorbing plate can be applied to an ultraviolet interceptive glass, a multilayered glass, a laminated glass, a heat wave reflective and ultraviolet interceptive glass, a heat wave and ultraviolet absorbing glass and an anti-fogging ultraviolet absorbing glass for windows of houses, a shopwindow, a functional glass for automobiles, vehicles, airplanes and ships, an ultraviolet interceptive film having the above-described ultraviolet absorbing layer formed on a film made from a resin and a film for agricultural use and for a greenhouse. Furthermore, the inventive ultraviolet absorbing plate may be those obtained by forming the above-described ultraviolet absorbing layer directly on the following articles instead of the above-described substrate. The articles can be exemplified by showcases, specimen cases, bulletin boards, architraves, glasses, sun glasses, cathode-ray tubes, LCD (Liquid Crystal Display) such as TN (Twisted Nematic), STN (Supertwisted Nematic), DSTN (Dual-scanned Supertwisted Nematic), FSTN (Film-compensated Supertwisted Nematic), OMI (Optical Mode Interference), ROCB (Reflective Optical Mode Interference), BTN (Bystable Twisted Nematic), ECB (Electrically Controlled By-fleegence), PALC (Plasma Addressed Liquid Crystal), G/H (Guest Host), mixed mode, PDLC (Polymer Dispersed Liquid Crystal), IPS (In Plane Switching), FLC (Ferroelectric Liquid Crystal) and AFLC (Anti-ferroelectric Liquid Display), PDP (Plasma Display Panel), FED (Field Emission Display), light-emission diode, thermochromic, electrochromic and photochromic devices, electroluminescence devices, light fittings, bottles and plastic containers for foods, soft drinks, liquors and cosmetics and plastic molded articles and so on.

Furthermore, the inventive ultraviolet absorbing plate can be used as various types of optical filters which are disposed on the outer or inner side of the above-mentioned devices or elements to provide it with ultraviolet absorbing capability. The inventive ultraviolet absorbing plate may be modified to the filter by providing the above-described ultraviolet absorbing layer directly on a substrate for various types of LCD, an elctrochromic device, a photochromic device, a PDP device, an FED device, a light-emitting diode, a thermochromic device and an elctroluminscence device and a substrate made of a transparent glass or a transparent plastic film. These optical filters may be suitably disposed anywhere in the above-mentioned devices.

In the case where the inventive ultraviolet absorbing plate is in the form of a multi-layer constituted by two or more of transparent substrates and having necessarily an ultraviolet absorbing transparent plate obtained by forming an ultraviolet absorbing layer on a transparent substrate, the embodiments of such multi-layer type plate are selective depending on the purpose thereof. The combinations of transparent substrates are illustrated as follows:

(1) an ultraviolet absorbing transparent plate and a transparent plate having no ultraviolet transparent layer (transparent substrate), (2) two ultraviolet absorbing transparent plates, (3) an ultraviolet absorbing transparent plate and a heat wave reflective transparent plate, (4) an ultraviolet absorbing transparent plate and an ultraviolet reflective transparent plate, (5) an ultraviolet absorbing transparent plate, a non-ultraviolet absorbing transparent plate and a heat wave reflective transparent plate, (6) an ultraviolet absorbing transparent plate and a selected wavelength reflective transparent plate, and (7) an ultraviolet absorbing transparent plate and a low emissivity transparent plate.

Needless to mention, the material of each transparent substrate may be the same or different. In the case of using an ultraviolet absorbing transparent plate, the ultraviolet absorbing layer formed thereon may be exposed to the outside or built in when assembled into the multiple layer plate, the latter being preferred.

These transparent plates may be contacted to each other or contacted so as to have a functional material intervened therebetween. Furthermore, the transparent plates may be disposed with a space to be vacuumed or filled with dry air, an inactivate gas or a functional material.

The ultraviolet absorbing multi-layered plate may be prepared by a known method except using at least one ultraviolet absorbing transparent plate. Specific examples of the multi-layered plate are as follows. For example, a multi-layered glass can be easily produced by using a spacer, a corner key, a drying agent, a sealer and a sealant in a suitable combination, the materials of which are not limited. For example, the spacers may be those of metals such as aluminum and alloy or of resins such as vinyl chloride. The corner keys used in combination with the spacer may be those of metals or resins. The drying agents to be put into the spacer are porous materials such as silica gel and zeolite. As a primary sealant, there may be used a polyisobutylene sealant containing butyl rubber as a main component. As a secondary sealant, there may be a polysulfide sealant. In the case of a laminated glass, there may be used a polyvinylbutyral resin and a polyurethane resin ethylene-vinyl acetate copolymer. In order to improve resistance to penetration, a resin film of polycarbonate or polyester may be inserted between interlayers each disposed on the confronting surfaces of two glasses.

In the case where the inventive ultraviolet absorbing plate is an ultraviolet absorbing electrically conductive transparent which is produced by forming the ultraviolet absorbing layer on a transparent substrate having a transparent electrically conductive layer thereon, the above-described overcoat layer may be disposed between the ultraviolet absorbing layer and the transparent electrically conductive layer.

No particular limitation imposed on the transparent electrically conductive layer employed for the present invention as long as it satisfies the requirement for transparency. For example, there may be used thin films of metal such as gold and silver and metal oxides such as ITO ($In_2O_3$—$SnO_2$), tin oxide, zinc oxide and vanadium oxide.

The film thickness is usually 100 to 5000 Å and preferably 500 to 3000 Å. The surface resistance (resistivity), which may be selected to a suitable value depending upon the usage of the transparent electrically conductive plate, is usually 0.5 to 500 $\Omega/cm^2$, preferably 2 to 50 $\Omega/cm^2$.

There is no particular limitation imposed on the method for forming the transparent electrically conductive layer and thus any of known methods may be employed depending upon the types of the metal oxides and metals used for the electrically conductive layer. Such methods may be exemplified by a vacuum deposition method, an ion plating method, a sputtering method and a solgel method. In any of these methods, the electrically conductive layer may be formed at the transparent substrate temperature ranging from 100° C. to 350° C.

The ultraviolet absorbing transparent electrically conductive substrate has preferably the above-specified specified ultraviolet absorbing layer between the transparent substrate and the transparent electrically conductive layer. The overcoat layer may or may not be disposed between the ultraviolet absorbing layer and the transparent electrically conductive layer. The simplest structure of the ultraviolet absorbing transparent electrically conductive substrate according to the invention has a transparent substrate 11, an ultraviolet absorbing layer 12, an overcoat layer 13 and a transparent electrically conductive layer 14, in this order, as shown in FIG. 1.

Figure 2:
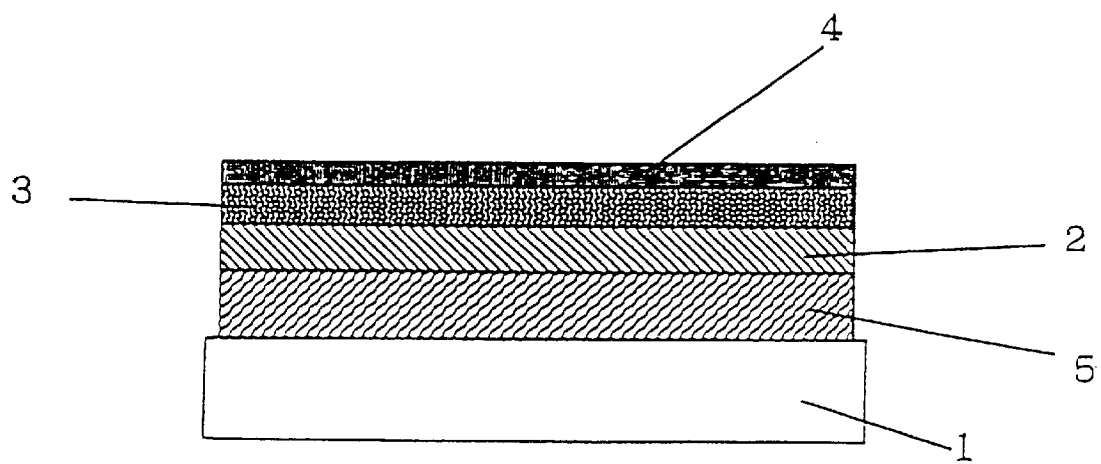
FIG. 2 is a schematic cross-sectional view showing another example of the ultraviolet absorbing layer according to the invention.

One or more intermediate layers 15 may also be provided between the transparent substrate 11 and the ultraviolet absorbing layer 12 as shown FIG. 2. Although there is no limitation to the function of the intermediate layer 5, it may be an ultraviolet absorbing layer containing inorganic oxides such as ZnO, $CeO_2$, and $TiO_2$ so as to suppressing deterioration of the organic ultraviolet absorber by far ultraviolet rays. Alternatively, the intermediate layer containing a silane coupling agent or a surfactant may also be provided for improving adhesion between the transparent substrate 11 and the ultraviolet absorbing layer 12.

Furthermore, one more intermediate layers may be provided between the ultraviolet absorbing layer 12 and the overcoat layer 13 as shown 3. No limitation is imposed on the functions of the intermediate layer 16. For example, an intermediate layer containing silane coupling agents or surfactants may be provided for improving adhesion between the overcoat layer 13 and the transparent electrically conductive layer 14.

Figure 3:
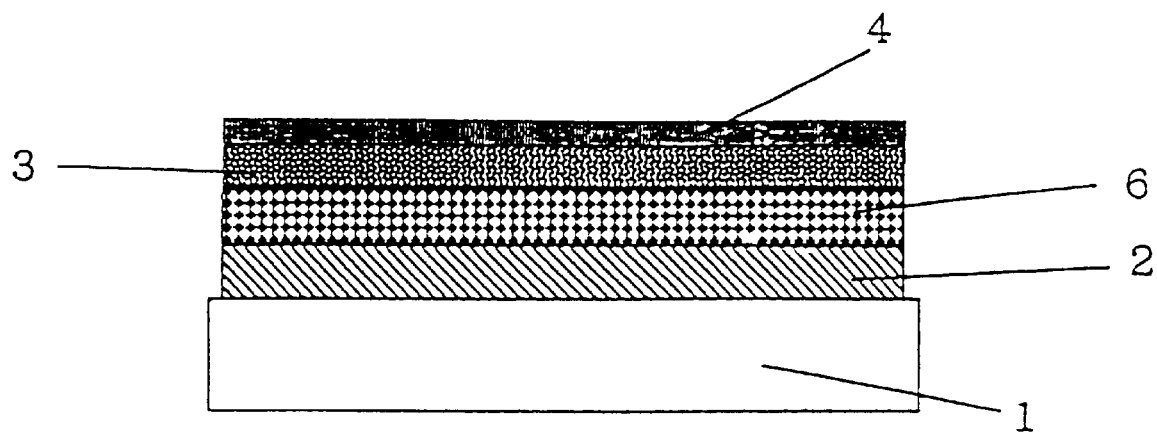
FIG. 3 is a schematic cross-sectional view showing further another example of the ultraviolet absorbing layer according to the invention.
Figure 4:
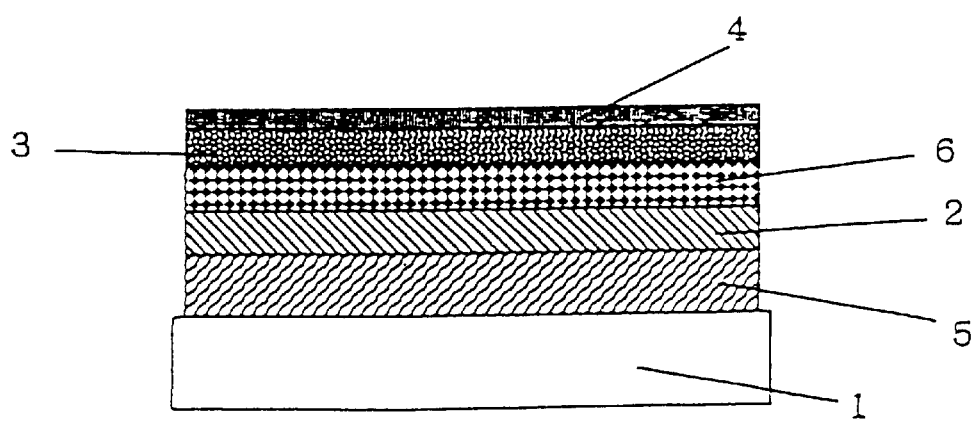
FIG. 4 is a schematic cross-sectional view showing still another example of the ultraviolet absorbing layer according to the invention.

More over, one or more intermediate layer 15, 16 may also be provided between the transparent substrate 11 and the ultraviolet absorbing layer 12 and between the overcoat layer 13 and the ultraviolet absorbing layer 12, respectively as shown in FIG. 4. Although there is no limitation to the functions of the intermediate layers 15, 16, they may have the functions similar to those explained with FIGS. 2 and 3.

The above-described layers may be provided not only on one surface but also both surfaces of the transparent electrically conductive plate.

Industrial Utility of the Invention

As described above, the ultraviolet absorbing material according to the invention has superior ultraviolet shielding effect and thus can be used as a suitable coating material which can easily provide weathering resistance and heat resistance properties. Due to the amide bond between the ultraviolet absorber and the matrix, the inventive ultraviolet absorbing material is free from bleedout and can maintain excellent ultraviolet absorbing power even over an extended period of time. Therefore, the ultraviolet absorbing plate according to the invention has an amide bond and an Si—O bond in its ultraviolet absorbing layer and can maintain excellent durability even with the high concentration of the ultraviolet absorbing components. In addition, the inventive ultraviolet absorbing plate is superior in resistance to weathering and resistance to heat and can sharply shield ultraviolet rays of longer wavelength with transmittance in visible regions being hardly reduced. The inventive ultraviolet absorbing plate has thus an extremely superior resistance to deterioration by ultraviolet rays and can be used as a variety of materials and products required to have a long duration of life.

In the case of the inventive ultraviolet absorbing plate comprising a transparent electrically conductive substrate, it has high electrical conductivity and superior ultraviolet shielding effect. In particular, if the ultraviolet absorbing layer is suitably selected, wavelength of 400 nm or less can be shielded very sharply. In addition, since the transparent electrically conductive layer can be formed easily due to the effect obtained by the overcoat layer interposed between the transparent electrically conductive layer and the ultraviolet absorbing layer, it becomes possible to protect an electric device produced by using the transparent electrically conductive layer against ultraviolet rays. By the chemical bond of the ultraviolet absorber to a polymer, the resulting ultraviolet absorbing layer is stable even during formation of the transparent electrically conductive layer, allowing to produce the transparent electrically conductive plate having the ultraviolet absorbing layer with ease. Because of the above features of the transparent electrically conductive substrate, it is highly useful as an electrochromic element aimed at light transmission control and display and a liquid crystal element for display.

The present invention will be further described by way of the following examples, which however should not be constructed in a limiting sense. In the examples, the measurements of ultraviolet absorbance and light transmittance to derive a change rate in ultraviolet absorbing power was conducted by using a device manufactured by Hitachi Seisaku-sho Co., Ltd. under a trade name U-3300 type spectrophotometer, in a wave range of 300 to 500 nm.

EXAMPLE 1

Synthesis of Ultraviolet Absorbing Layer Having Carboxyl Group 225 grams (0.46 mol) of octyl 3-(5-chloro-2H-benzotriazole-2-yl)-5-(1,1-dimethylethyl)-4-hydroxy-benzen propanate manufactured by Chiba-Geigy Co., Ltd. under the trade name of TINUVIN 109 were dissolved in 700 ml acetone and then added with 600 ml 2N sodium hydroxide solution, followed by stirring at room temperature for 24 hours. The resulting mixture was acidified with 650 ml 2N hydrochloric acid and filtered to obtain an insoluble product, followed by washing it with distilled water until the filtrate being neutralized. The resulting product was dried in vacuum and recrystalized in toluene thereby obtaining 3-(5-chloro-2H-benzotriazole-2-yl)-5-(1,1 -dimethylehtyl)-4-hydroxyy-benzene propanoic acid referred to as Compound A hereinafter.

Preparation of Ultraviolet Absorbing Material 3 grams of 3-aminopropyltriethoxysilane were dissolved in 35 grams of xylene and added gradually with 5 grams of Compound A while being heated at a temperature of 80° C. Upon completion of the addition, the resulting mixture was heated up to a temperature of 130° C. and refluxed for 3 hours. The mixture was disposed still to cool down and added with 16 grams 3-glycidopropyltrimethoxysilane thereby obtaining an ultraviolet absorbing material (coating liquid).

$^{13}$C-NMR analysis of the resulting ultraviolet absorbing material revealed that there was a peak of carbonyl at about 173 ppm thereby confirming the existence of an amide bond derived from the aminosilane compound.

Preparation of Ultraviolet Absorbing Plate

The ultraviolet absorbing material obtained above was spray-coated over a glass substrate and disposed still at room temperature for 20 minutes thereby obtaining an ultraviolet absorbing glass (ultraviolet absorbing plate) having an ultraviolet absorbing layer of 17 μm thickness.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond.

Figure 5:
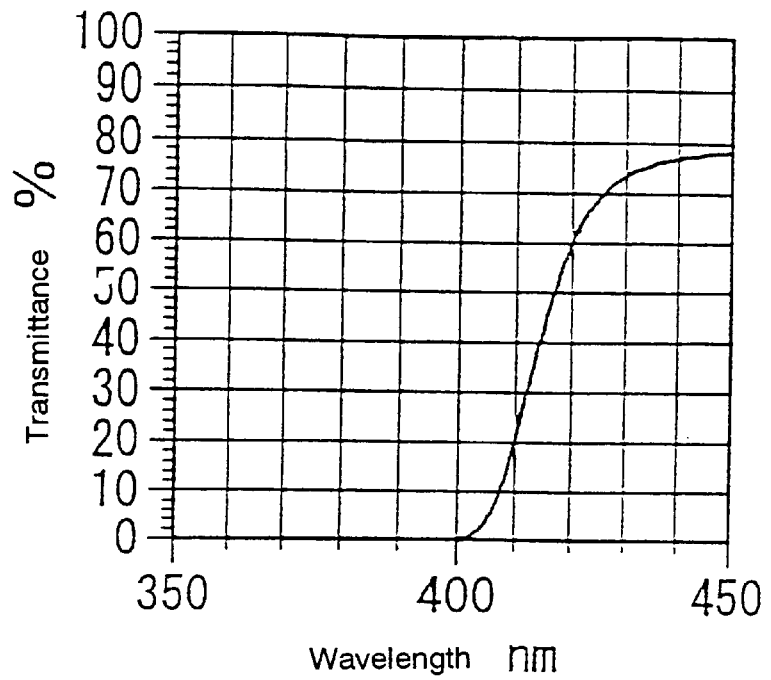
FIG. 5 is a graph showing the visible ultraviolet absorbing spectral of the ultraviolet absorbing glass produced in Example 1.

FIG. 5 shows ultraviolet visible absorbing spectrum of the ultraviolet absorbing glass. As apparent from FIG. 5, this glass fully shielded ultraviolets of less than 400 nm. Furthermore, this glass performed a superior ultraviolet shielding effect over an extended period of time.

EXAMPLE 2

Preparation of Ultraviolet Absorbing Multi-layer Glass

A multi-layer glass was prepared in a conventional manner by using the ultraviolet absorbing glass obtained in Example 1 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 3

A silicone resin (APZ-7705, manufactured by Nippon Unicar Co., Ltd.) was spray-coated over the ultraviolet absorbing layer of the ultraviolet absorbing glass obtained in Example 1 and dried at a temperature of 100° C. for 20 minutes thereby forming a protection layer having a thickness of 2 μm.

Preparation of Ultraviolet Absorbing Transparent Electrically Conductive Substrate ITO was formed on the protection layer by sputtering at a substrate temperature of 250° C. to form a transparent electrically conductive layer having a layer thickness of about 3300 Å and an electrical resistance of 7.5 Ω/cm$^2$ thereby producing a transparent electrically conductive substrate having ultraviolet absorbing capability. FIG. 5 shows the spectral transmittance of the transparent electrically conductive substrate.

EXAMPLE 4

The ultraviolet absorbing material obtained in Example 1 was spray-coated over a stainless plate of red color and disposed still for 20 minutes, followed by heating at a temperature of 200° C. for 20 minutes thereby obtaining an ultraviolet absorbing resin plate having an ultraviolet absorbing layer with a thickness of 17 μm. The resulting resin plate was left under radiation of ultraviolet ray and observed to be extremely less in discoloration than a plate devoid of the coating.

EXAMPLE 5
Preparation of Ultraviolet Absorbing Material 3 grams of 3-aminopropyltriethoxysilane were dissolved with 40 grams of xylene and gradually added with 5 gram Compound A prepared in Example 1 while being heated at a temperature of 60° C. After completion of the addition, the mixture was heated up to a temperature of 130° C. and refluxed for 3 hours thereby obtaining an ultraviolet absorbing material in the form of a solution.

A peak of carbonyl at about 173 ppm derived from the amide bond was observed by $^{13}$C-NMR analysis of the resulting solution thereby confirming the existence of the amide bond derived from the aminosilane compound.
Preparation of Ultraviolet Absorbing Plate The ultraviolet absorbing material was spray-coated over a glass plate and disposed still at room temperature for 20 minutes, followed by heating at a temperature of 130° C. for 30 minutes thereby producing an ultraviolet absorbing glass (ultraviolet absorbing plate) having an ultraviolet absorbing layer with a thickness of 10 μm.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond.

The ultraviolet absorbing spectrum of the ultraviolet absorbing glass was measured and found to perfectly shield ultraviolets similarly to that of Example 1. Furthermore, this glass performed a superior ultraviolet shielding effect over an extended period of time.

EXAMPLE 6
Preparation of Ultraviolet Absorbing Multi-layer Glass

A multi-layer glass was prepared in a conventional manner by using the ultraviolet absorbing glass obtained in Example 5 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 7

A silicone resin (APZ-7705, manufactured by Nippon Unicar Co., Ltd.) was spray-coated over the ultraviolet absorbing layer of the ultraviolet absorbing glass obtained in Example 5 and dried at a temperature of 100° C. for 20 minutes thereby forming a protection layer having a thickness of 2 μm.

The ultraviolet visible absorbing spectrum of the ultraviolet absorbing glass having a protection layer thus formed was measured and found to shield completely ultraviolet similarly to that of Example 5.
Preparation of Ultraviolet Absorbing Transparent Electrically Conductive Substrate ITO was formed on the protection layer by sputtering at a substrate temperature of 250° C. to form a transparent electrically conductive layer having a layer thickness of about 3300 Å and an electrical resistance of 7.5 Ω/cm$^2$ thereby producing a transparent electrically conductive substrate having ultraviolet absorbing capability. Similarly to Example 5, the substrate exhibits little change in spectrum, compared with that before sputtering.

EXAMPLE 8

The ultraviolet absorbing material obtained in Example 5 was spray-coated over a red polyethylene terephthalate (TET) of red color and disposed still for 20 minutes, followed by heating at a temperature of 200° C. for 20 minutes thereby obtaining an ultraviolet absorbing resin plate having an ultraviolet absorbing layer with a thickness of 17 μm. The resulting resin plate was left under radiation of ultraviolet ray and found to be extremely less in discoloration than a plate devoid of the coating.

EXAMPLE 9
Preparation of Ultraviolet Absorbing Material 17.7 grams of silicone varnish manufactured by Okitsumo Co., Ltd. under the trade name of XO-7931-CLEAR and 3 grams of 3-aminopropyltriethoxysilane were dissolved in 35 grams of xylene and added gradually with 5 grams of Compound A while being heated at a temperature of 80° C. After completion of the addition, the resulting mixture was heated up to 130° C. and refluxed for 3 hours thereby obtaining an ultraviolet absorbing material in the form of a solution (coating liquid).
Preparation of Ultraviolet Absorbing Transparent Substrate The ultraviolet absorbing material thus obtained was spray-coated over a glass substrate and disposed still at room temperature for 20 minutes, followed by heating at a temperature of 200° C. for 20 minutes thereby producing an ultraviolet absorbing glass having an ultraviolet absorbing layer with a thickness of 17 μm. A grid test was conducted for the resulting ultraviolet absorbing glass and 50% of peel-off was observed.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond.

After the resulting ultraviolet absorbing glass was extracted in boiled acetone for 24 hours, about 3% of change in ultraviolet absorbing power was observed in accordance with the measurement using the above-described mathematical formula (1). From this measurement, it was found that the ultraviolet absorber was bonded to the resin through aminosilane.

Figure 6:
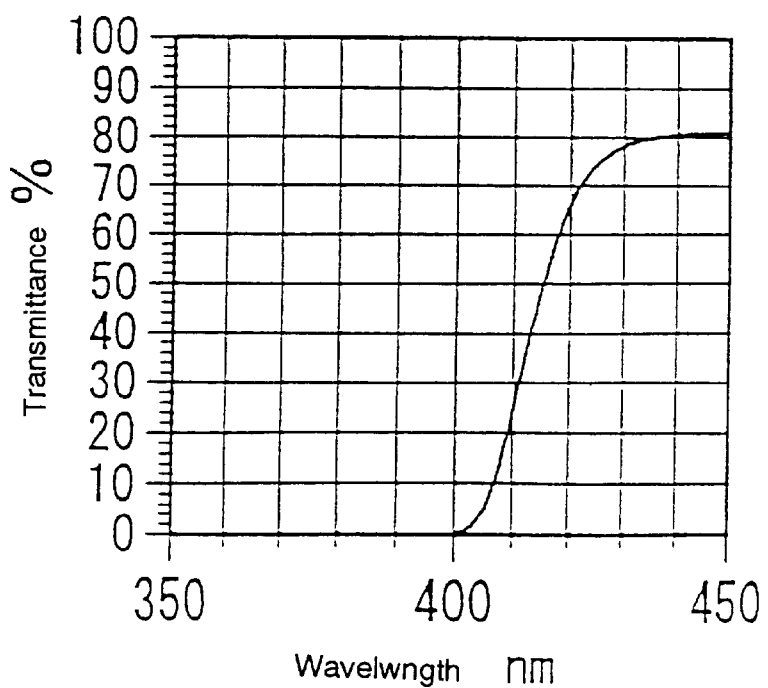
FIG. 6 is a graph showing the visible ultraviolet absorbing spectral of the ultraviolet absorbing glass produced in Example 9.

FIG. 6 shows the ultraviolet visible absorbing spectrum of the ultraviolet absorbing glass. As apparent form FIG. 6, the glass completely shielded ultraviolets of less than 400 nm. The result of the pencil hardness test stipulated by JIS K5400 was 2H. The ultraviolet absorbing glass was left in a sunshine weather meter for 1000 hours and the change rate in ultraviolet absorbing power was still less than 2%.

EXAMPLE 10
Preparation of Ultraviolet Absorbing Multi-layer Glass

A multi-layer glass was prepared in a conventional manner by using the ultraviolet absorbing glass obtained in Example 9 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 11

A silicone resin (APZ-7705, manufactured by Nippon Unicar Co., Ltd.) was spray-coated over the ultraviolet absorbing layer of the ultraviolet absorbing glass obtained in Example 9 and dried at a temperature of 100° C. for 20 minutes thereby forming a protection layer having a thickness of 2 μm.

Preparation of Ultraviolet Absorbing Transparent Electrically Conductive Substrate ITO was formed on the protection layer by sputtering at a substrate temperature of 250° C. to form a transparent electrically conductive layer having a layer thickness of about 3300 Å and an electrical resistance of 7.5 Ω/cm$^2$ thereby producing a transparent electrically conductive substrate having ultraviolet absorbing capability. FIG. 6 shows the spectral transmittance of the resulting transparent electrically conductive substrate.

EXAMPLE 12

The ultraviolet absorbing material obtained in Example 9 was spray-coated over a unwoven textile of red color and disposed still at room temperature for 20 minutes, followed by heating at a temperature of 200° C. for 20 minutes thereby obtaining an ultraviolet absorbing resin plate having an ultraviolet absorbing layer with a thickness of 17 μm. The resulting resin plate was left under radiation of ultraviolet ray and observed to be less in discoloration than a plate devoid of the coating.

EXAMPLE 13
Preparation of Ultraviolet Absorbing Material 17.7 grams of silicone varnish manufactured by Okitsumo Co., Ltd. under the trade name of XO-7931-CLEAR and 3 grams of 3-aminopropyltriethoxysilane were dissolved in 35 grams of xylene and added gradually with 5 grams of Compound A while being heated at a temperature of 80° C. After completion of the addition, the resulting mixture was heated up to 130° C. and refluxed for 3 hours, followed by being allowed to cool down, thereby obtaining an ultraviolet absorbing material in the form of a solution (coating liquid).

Preparation of Ultraviolet Absorbing Transparent Substrate

The ultraviolet absorbing material thus obtained was spray-coated over a glass substrate and disposed still at room temperature for 20 minutes, followed by heating at a temperature of 200° C. for 20 minutes thereby producing an ultraviolet absorbing glass having an ultraviolet absorbing layer with a thickness of 17 μm. Unlike Example 9, a grid test revealed no peeling-off.

Figure 7:
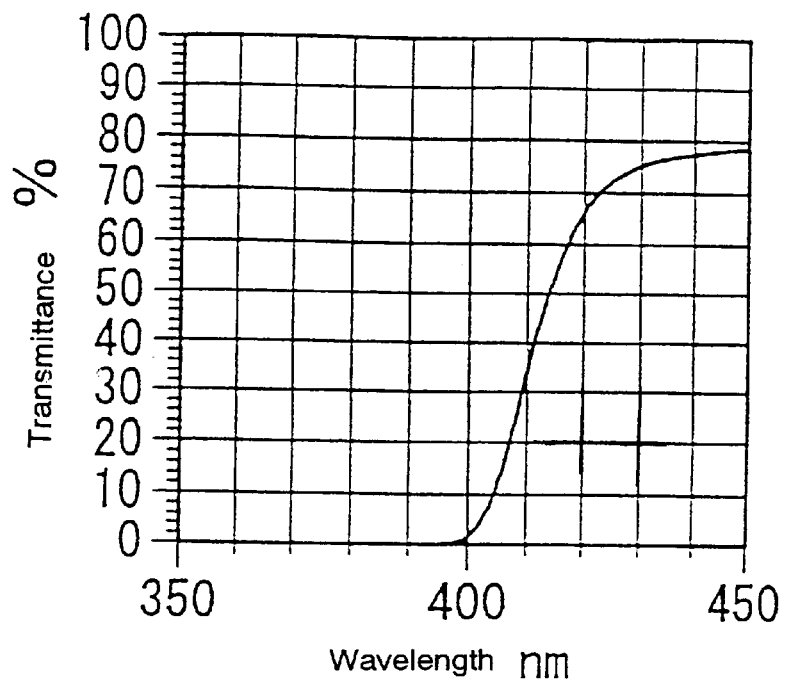
FIG. 7 is a graph showing the visible ultraviolet absorbing spectral of the ultraviolet absorbing glass produced in Example 13.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond. FIG. 7 shows ultraviolet visible absorbing spectrum of the resulting glass plate. As apparent form FIG. 7, the glass was found to have a superior ultraviolet shielding capability similar to that of Example 1. The ultraviolet absorbing glass performed a superior ultraviolet shielding capability over an extended period of time.

EXAMPLE 14
Preparation of Ultraviolet

A multi-layer glass was prepared in a conventional manner by using the ultraviolet absorbing glass obtained in Example 13 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 15

A silicone resin (APZ-7705, manufactured by Nippon Unicar Co., Ltd.) was spray-coated over the ultraviolet absorbing layer of the ultraviolet absorbing glass obtained in Example 13 and dried at a temperature of 100° C. for 20 minutes thereby forming a protection layer having a thickness of 2 μm.

Preparation of Ultraviolet Absorbing Transparent Electrically Conductive Substrate ITO was formed on the protection layer thus formed by sputtering at a substrate temperature of 250° C. to form a transparent electrically conductive layer having a layer thickness of about 3300 Å and an electrical resistance of 7.5 Ω/cm$^2$ thereby producing a transparent electrically conductive substrate having ultraviolet absorbing capability. FIG. 7 shows the spectral transmittance of the transparent electrically conductive substrate.

EXAMPLE 16

The ultraviolet absorbing material obtained in Example 13 was spray-coated over a acrylic plate of red color and disposed still at room temperature for 20 minutes, followed by heating at a temperature of 200° C. for 20 minutes thereby obtaining an ultraviolet absorbing resin plate having an ultraviolet absorbing layer with a thickness of 17 μm. The resulting resin plate was left under radiation of ultraviolet ray and observed to be less in discoloration than a plate devoid of the coating.

EXAMPLE 17
Preparation of Ultraviolet Absorbing Material 17.7 grams of silicone varnish manufactured by Okitsumo Co., Ltd. under the trade name of XO-7931-CLEAR and 3 grams of 3-aminopropyltriethoxysilane were dissolved in 35 grams of xylene and added gradually with 5 grams of Compound A while being heated at a temperature of 80° C. After completion of the addition, the resulting mixture was heated up to 130° C. and refluxed for 3 hours. Then the mixture was allowed to cool down and added with 16 grams of 3-glycidoxypropyltrimethoxysilane and 8 grams of colloidal silica dispersions manufactured by Nissan Kagaku Co., Ltd. under the trade name of "MIBK-ST" thereby obtaining an ultraviolet absorbing material in the form of a solution (coating liquid).

Preparation of Ultraviolet Absorbing Transparent Substrate

The ultraviolet absorbing material thus obtained was spray-coated over a glass substrate and disposed still at room temperature for 20 minutes, followed by heating at a temperature of 200° C. for 20 minutes thereby producing an ultraviolet absorbing glass having an ultraviolet absorbing layer with a thickness of 17 μm. The result of a pencil hardness test in accordance with JIS K 5400 was 4H.

Figure 8:
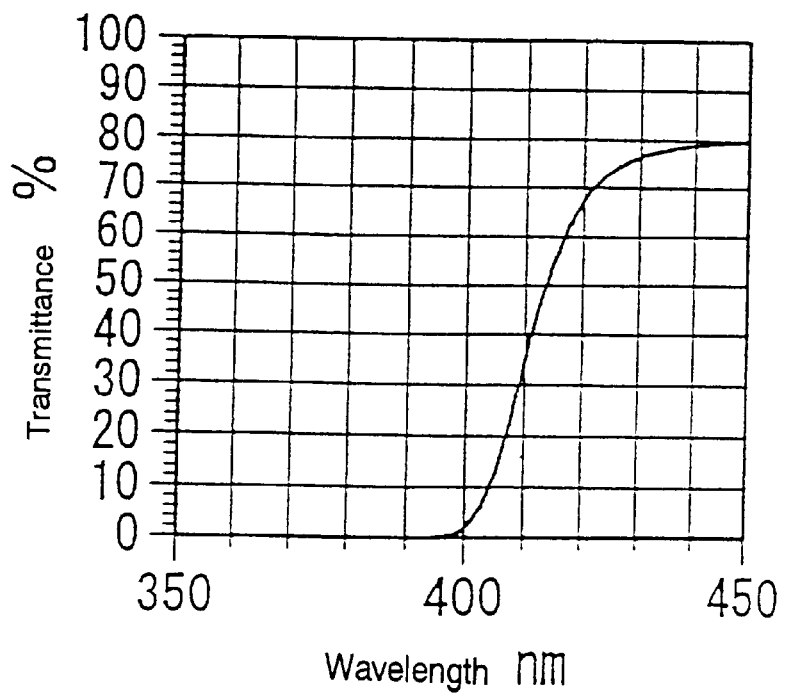
FIG. 8 is a graph showing the visible ultraviolet absorbing spectral of the ultraviolet absorbing glass produced in Example 17.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond. FIG. 8 shows the ultraviolet visible absorbing spectrum of the resulting glass plate. As apparent form FIG. 8, the glass was found to have a superior ultraviolet shielding capability similar to that of Example 1. The ultraviolet absorbing glass performed a superior ultraviolet shielding capability over an extended period of time.

EXAMPLE 18
Preparation of Ultraviolet Absorbing Multi-layer Glass

A multi-layer glass was prepared in a conventional manner by using the ultraviolet absorbing glass obtained in Example 17 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 19
Preparation of Ultraviolet Absorbing Transparent Electrically Conductive Substrate ITO was formed on the ultraviolet absorbing glass prepared in Example 17 by sputtering at a substrate temperature of 250° C. to form a transparent electrically conductive layer having a layer thickness of about 3300 Å and an electrical resistance of 7.5 $\Omega/cm^2$ thereby producing a transparent electrically conductive substrate having ultraviolet absorbing capability. FIG. 8 shows the spectral transmittance of the transparent electrically conductive substrate.

EXAMPLE 20
Preparation of Ultraviolet Absorbing Transparent Electrically Conductive Substrate ITO was formed on the ultraviolet absorbing glass of prepared in Example 17 by sputtering at a substrate temperature of 250° C. to form a transparent electrically conductive layer having a layer thickness of about 3300 Å and an electrical resistance of 7.5 $\Omega/cm^2$ thereby producing a transparent electrically conductive substrate having ultraviolet absorbing capability. The ultraviolet visible absorbing spectrum of the resulting substrate was measured and found to have a superior ultraviolet shielding capability similarly to that of Example 1.

EXAMPLE 21

The ultraviolet absorbing material obtained in Example 17 was spray-coated over a polycarbonate of red color and disposed still at room temperature for 20 minutes, followed by heating at a temperature of 200° C. for 20 minutes thereby obtaining an ultraviolet absorbing resin plate having an ultraviolet absorbing layer with a thickness of 17 μm. The resulting resin plate was left under radiation of ultraviolet ray and found to be less in discoloration than a plate devoid of the coating.

EXAMPLE 22
Preparation of Solution of Epoxysilane Copolymer 200 grams of 3-glycidoxypropylmethoxysilane was dissolved in 75 grams xylene and added gradually with 4 ml boron trifluoride diethylehter complex at room temperature. The resulting mixture was stirred for 4 hours and then subjected to ring-opening polymerization thereby preparing a epoxysilane copolymer solution. The resulting polymer was 3,300 Mw in molecular weight by polystylene conversion.

Preparation of Ultraviolet Absorbing Coating Liquid 17.7 grams of silicone varnish manufactured by Okitsumo Co., Ltd. under the trade name of XO-7931-CLEAR and 3 grams of 3-aminopropyltriethoxysilane were dissolved in 29 grams of xylene and added gradually with 5 grams of Compound A while being heated at a temperature of 80° C. After completion of the addition, the resulting mixture was heated up to 130° C. and refluxed for 3 hours. The mixture was allowed to cool down and added with 22 grams of the epoxysilane copolymer solution obtained above thereby obtaining an ultraviolet absorbing material in the form of a solution (coating liquid).

Preparation of Ultraviolet Absorbing Transparent Substrate

The ultraviolet absorbing material thus obtained was spray-coated over a glass substrate and disposed still at room temperature for 20 minutes, followed by heating at a temperature of 150° C. for 30 minutes thereby producing an ultraviolet absorbing glass having an ultraviolet absorbing layer with a thickness of 15 μm. The result of a pencil hardness test in accordance with JIS K 5400 was 6H.

Figure 9:
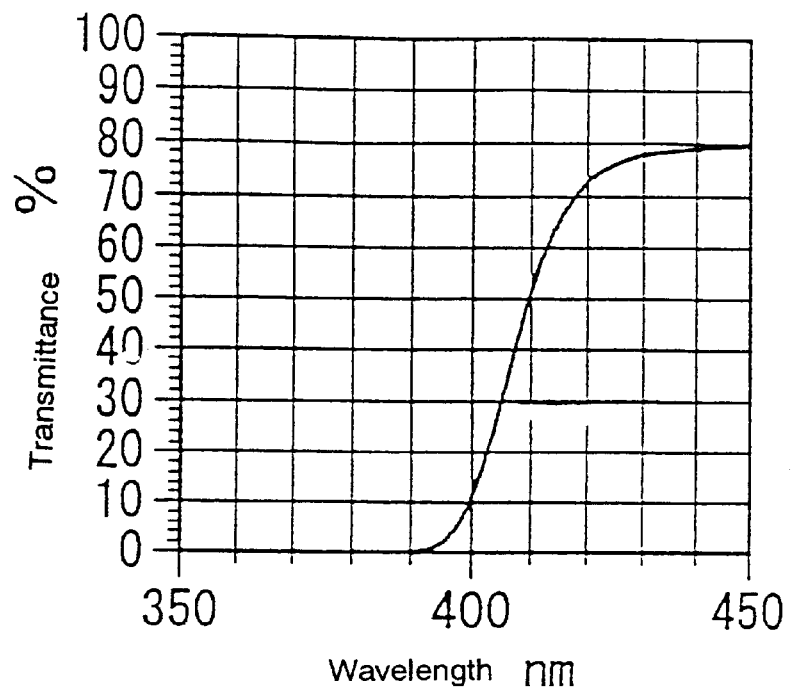
FIG. 9 is a graph showing the visible ultraviolet absorbing spectral of the ultraviolet absorbing glass produced in Example 21.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond. FIG. 9 shows the ultraviolet visible absorbing spectrum of the resulting glass plate. As apparent form FIG. 9, the glass was found to have a superior ultraviolet shielding capability similar to that of Example 1. The ultraviolet absorbing glass performed a superior ultraviolet shielding capability over an extended period of time.

EXAMPLE 23
Preparation of Ultraviolet Absorbing Multi-layer Glass

A multi-layer glass was prepared in a conventional manner by using the ultraviolet absorbing glass obtained in Example 22 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 24

A silicone resin (APZ-7705, manufactured by Nippon Unicar Co., Ltd.) was spray-coated over the ultraviolet absorbing layer of the ultraviolet absorbing glass obtained in Example 22 and dried at a temperature of 100° C. for 20 minutes thereby forming a protection layer having a thickness of 2 μm.

Preparation of Ultraviolet Absorbing Transparent Electrically Conductive Substrate ITO was formed on the protection layer thus formed by sputtering at a substrate temperature of 250° C. to form a transparent electrically conductive layer having a layer thickness of about 3300 Å and an electrical resistance of 7.5 $\Omega/cm^2$ thereby producing a transparent electrically conductive substrate having ultraviolet absorbing capability. FIG. 9 shows the spectral transmittance of the transparent electrically conductive substrate.

EXAMPLE 25

The ultraviolet absorbing material obtained in Example 22 was spray-coated over a plywood of red color and disposed still at room temperature for 20 minutes, followed by heating at a temperature of 200° C. for 20 minutes thereby obtaining an ultraviolet absorbing resin plate having an overcoated ultraviolet absorbing layer with a thickness of 17 μm. The resulting resin plate was left under radiation of ultraviolet ray and observed to be less in discoloration than a plate devoid of coating.

EXAMPLE 26

The ultraviolet absorbing material (coating liquid) prepared in Example 22 was further added with 8 gram colloidal silica dispersions manufactured by Nissan Kagaku Co., Ltd. under the trade name of "MIBK-ST" thereby obtaining an ultraviolet absorbing material (new coating liquid).

The new coating liquid was spray-coated over a glass substrate and disposed still at room temperature for 20 minutes, followed by heating at a temperature of 150° C. for 30 minutes thereby obtaining a glass plate having an ultraviolet absorbing layer with a thickness of 15 μm. The resulting substrate was measured for ultraviolet visible absorbing spectrum and found to have superior ultraviolet shielding capability similarly to that of Example 1.

EXAMPLE 27
Preparation of Ultraviolet Absorbing Transparent Electrically Conductive Substrate ITO was formed on the ultraviolet absorbing glass prepared in Example 26 by sputtering at a substrate temperature of 250° C. to form a transparent electrically conductive layer having a layer thickness of about 3300 Å and an electrical resistance of 7.5 $\Omega/cm^2$ thereby producing a transparent electrically conductive substrate having ultraviolet absorbing capability. The ultraviolet visible absorbing spectrum of the resulting substrate was measured and found to have a superior ultraviolet shielding capability similarly to that of Example 1.

EXAMPLE 28
Preparation of Ultraviolet Absorbing Material 3 grams of 3-aminopropyltriethoxysilane and 11 grams of the epoxysilane copolymer solution prepared in Example 6 were dissolved in 32 grams of xylene and added gradually with 5 grams of Compound A while being heated at a temperature of 80° C. After completion of the addition, the resulting mixture was heated up to 130° C. and refluxed for 3 hours thereby obtaining an ultraviolet absorbing material (coating liquid).
Preparation of Ultraviolet Absorbing Transparent Substrate The ultraviolet absorbing material thus obtained was spray-coated over a glass substrate and disposed still at room temperature for 20 minutes, followed by heating at a temperature of 150° C. for 30 minutes thereby producing an ultraviolet absorbing glass having an ultraviolet absorbing layer with a thickness of 15 μm. The result of a pencil hardness test in accordance with JIS K 5400 was 5H.

Figure 10:
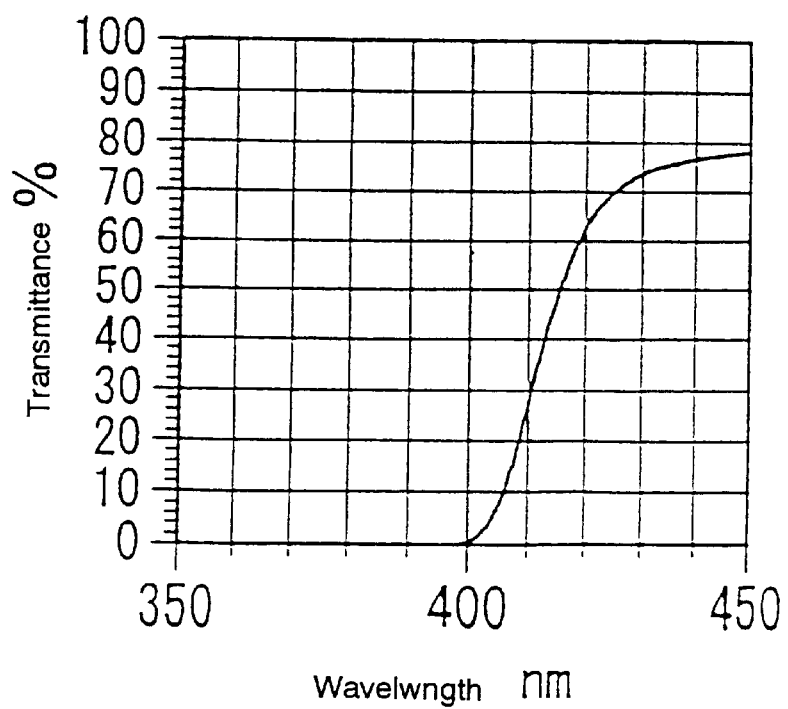
FIG. 10 is a graph showing the visible ultraviolet absorbing spectral of the ultraviolet absorbing glass produced in Example 25.

A portion of the ultraviolet absorbing layer was scraped out and subjected to $^{13}$C-NMR analysis. It was observed that there was a peak of carbonyl (about 173 ppm) derived from the amide bond. $^{29}$Si-NMR analysis also revealed the existence of the Si—O bond. FIG. 10 shows the ultraviolet visible absorbing spectrum of the resulting glass plate. As apparent form FIG. 10, the glass was found to have a superior ultraviolet shielding capability similarly to that of Example 1. The ultraviolet absorbing glass performed superior ultraviolet shielding capability over an extended period of time.

EXAMPLE 29
Preparation of Ultraviolet Absorbing Multi-layer Glass

A multi-layer glass was prepared in a conventional manner by using the ultraviolet absorbing glass obtained in Example 28 and a commercial soda lime glass. There were used an aluminum spacer, a corner key, a butyl rubber, a drying agent and polysulfide all of which are manufactured by Teipa Chemical Industry Co., Ltd. The resulting multi-layer glass was superior in heat resistance and capable of perfectly shielding ultraviolets over an extended period of time.

EXAMPLE 30

A silicone resin (APZ-7705, manufactured by Nippon Unicar Co., Ltd.) was spray-coated over the ultraviolet absorbing layer of the ultraviolet absorbing glass obtained in Example 28 and dried at a temperature of 100° C. for 20 minutes thereby forming a protection layer having a thickness of 2 μm.
Preparation of Ultraviolet Absorbing Transparent Electrically Conductive Substrate ITO was formed on the protection layer thus formed by sputtering at a substrate temperature of 250° C. to form a transparent electrically conductive layer having a layer thickness of about 3300 Å and an electrical resistance of 7.5 $\Omega/cm^2$ thereby producing a transparent electrically conductive substrate having ultraviolet absorbing capability. FIG. 10 shows the spectral transmittance of the transparent electrically conductive substrate.

EXAMPLE 31

The ultraviolet absorbing material obtained in Example 28 was spray-coated over a ceramic of red color and disposed still at room temperature for 20 minutes, followed by heating at a temperature of 200° C. for 20 minutes thereby obtaining an ultraviolet absorbing resin plate having an ultraviolet absorbing layer with a thickness of 17 μm. The resulting resin plate was left under radiation of ultraviolet ray and observed to be less in discoloration than a plate devoid of coating.

EXAMPLE 32

The ultraviolet absorbing material (coating liquid) prepared in Example 28 was further added with 8 gram colloidal silica dispersions manufactured by Nissan Kagaku Co., Ltd. under the trade name of "MIBK-ST" thereby obtaining an ultraviolet absorbing material (new coating liquid).

The new coating liquid was spray-coated over a glass substrate and disposed still at room temperature for 20 minutes, followed by heating at a temperature of 150° C. for 30 minutes thereby obtaining a glass plate having an ultraviolet absorbing layer with a thickness of 15 μm. The ultraviolet visible absorbing spectrum of the resulting substrate was measured and found to have superior ultraviolet shielding capability similarly to that of Example 1.

EXAMPLE 33
Preparation of Ultraviolet Absorbing Transparent Electrically Conductive Substrate ITO was formed on the ultraviolet absorbing glass prepared in Example 32 by sputtering at a substrate temperature of 250° C. to form a transparent electrically conductive layer having a layer thickness of about 3300 Å and an electrical resistance of 7.5 $\Omega/cm^2$ thereby producing a transparent electrically conductive substrate having ultraviolet absorbing capability. The ultraviolet visible absorbing spectrum of the resulting substrate was measured and found to have a superior ultraviolet shielding capability similarly to that of Example 1.

COMPARATIVE EXAMPLE 1

22.2 grams of silicone varnish manufactured by Okitsumo Co., Ltd. under the trade name of XO-7931 -CLEAR was added with 10 grams of octyl 3-(5-chloro-2H-benzotriazole-2-yl)-5-(1,1-dimethylethyl)-4-hydroxy-benzen propanate manufactured by Chiba-Geigy Co., Ltd. under the trade name of TINUVIN 109 and then with 20 μl di-n-butyltin dilaurate, followed by dilution with 20 ml of dimethyl formamide (DMF). The resulting mixture was spray-coated over a glass substrate. The resulting product was dried on a hot plate at 60° C. for 15 minutes and cured by heating in an oven at 200° C. for one hour thereby obtaining an ultraviolet absorbing glass having an ultraviolet absorbing layer about 20 μm. The resulting ultraviolet absorbing glass became whitely turbid due to the precipitation of the ultraviolet absorber.

COMPARATIVE EXAMPLE 2

22.2 grams of silicone varnish manufactured by Okitsumo Co., Ltd. under the trade name of XO-7931-CLEAR was added with 2.2 grams of octyl 3-(5-chloro-2H-benzotriazole-2-yl)-5-(1,1-dimethylethyl)-4-hydroxy-benzen propanate manufactured by Chiba-Geigy Co., Ltd. under the trade name of TINUVIN 109 and then with 20 μl di-n-butyltin dilaurate, followed by dilution with 20 ml of dimethyl formamide (DMF). The resulting mixture was spray-coated over a glass substrate. The resulting product was dried on a hot plate at 60° C. for 15 minutes and cured by heating in an oven at 200° C. for one hour thereby obtaining an ultraviolet absorbing glass having an ultraviolet absorbing layer about 15 μm. The resulting ultraviolet absorbing glass did not become whitely turbid but were insufficient in ultraviolet shielding capability.

The resulting ultraviolet absorbing glass was subjected to extraction in boiled acetone similarly to that of Example 9. It was found that there was 48% decrease in weight and 95% change rate in ultraviolet absorbing capability and that most of the ultraviolet absorber was eluted. Furthermore, the glass was left in a sunshine weather meter for 1000 hours. There was found 50% change rate in ultraviolet absorbing capability and thus reduced ultraviolet shielding capability.

COMPARATIVE EXAMPLE 3

Ultra-fine ZnO particle dispersion coatings manufactured by Resino Color Industry Co., Ltd. under the trade name of UV-S-400 was dip-coated over a glass substrate and cured by heating at 200° C. for 20 minutes thereby forming an ultraviolet absorbing layer having a thickness of 2 μm. A methylene chloride solution of polyether sulfone manufactured by ICI Co., Ltd. under the trade name of "VICTREX" PES 4100 P was spin-coated over the ultraviolet absorbing layer thus formed thereby forming a polymer layer of about 2 μm in thickness.

On the polymer layer was further coated the silicone varnish used in Example 2 to form an ultraviolet absorbing layer of 15 μm in thickness.

Figure 11:
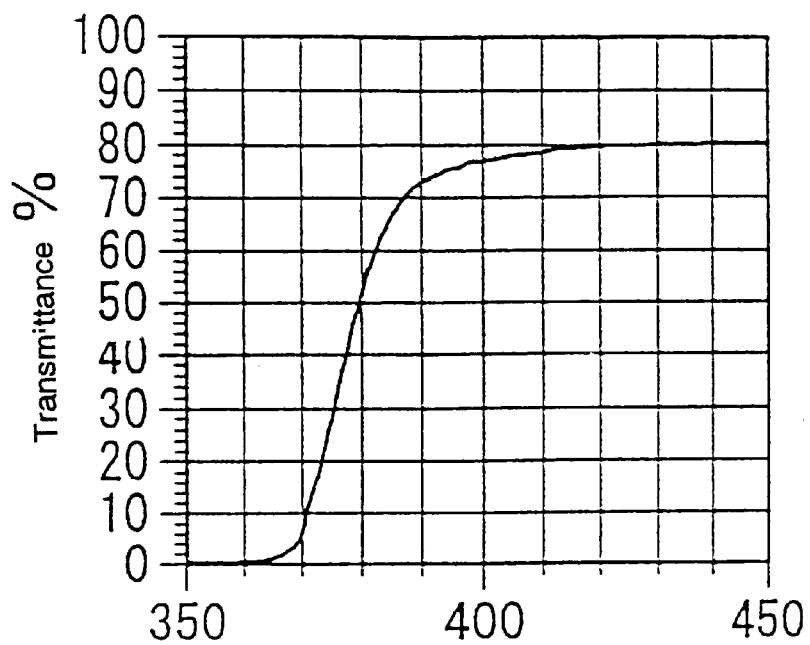
FIG. 11 is a graph showing the visible ultraviolet absorbing spectral of the ultraviolet absorbing glass produced in Comparative Example 3.

Polyimide varnish manufactured by Nissan Chemical Industries Co., Ltd. under the trade name of RN-812 was then spin-coated over the ultraviolet absorbing layer thus formed. The resulting product was cured by heating in an oven at a temperature of 200° C. for 30 minutes after the solvent was dried off at a hot plate at a temperature of 60° C. thereby forming an overcoat layer of 2 μm. Then, ITO was formed over the overcoat layer by sputtering at a substrate temperature of not higher than 250° C. thereby obtaining a transparent electrically conductive substrate having a transparent electrically conductive ultraviolet shielding layer with a layer thickness of 2050 Å and a surface resistance of 9.5 Ω/cm². FIG. 11 shows the spectral transmittance of the transparent electrically conductive substrate.

What is claimed is:

1. An ultraviolet absorbing plate produced by providing on a substrate an ultraviolet absorbing layer formed from an ultraviolet absorbing material having an amide bond and an Si—O bond, wherein said ultraviolet absorbing material comprises a reaction product of (a) an aminosilane compound of formula (1) or a hydrolysate thereof with (b) an ultraviolet absorber having in its molecules a carboxyl group so as to form an amide bond derived from the aminosilane compound or a hydrolysate thereof, said formula (1) being represented by

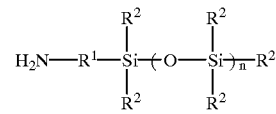

(1)

wherein $R^1$ is a $C_1$–$C_{10}$ alkylene group or a divalent group of the formula —$(CH2)_m$—NH— in which m is an integer of 1–4, $R^2$ are the same or different and each is selected from the group consisting of a hydrogen atom, a hydroxyl group, a halogen atom, a $C_1$–$C_{10}$ alkyl group and a $C_1$–$C_{10}$ alkoxy group, provided that at least one of $R^2$ is an alkoxy group, and n is an integer of 0 or greater.

2. An ultraviolet absorbing plate according to claim 1 wherein the reaction of said aminosilane compound or a hydrolysate thereof with said ultraviolet absorber having in its molecules an carboxyl group is conducted in the presence of a silicone resin or is conducted and thereafter added with a silicone resin after completion of the reaction.

3. An ultraviolet absorbing plate according to claim 1 wherein said ultraviolet absorbing material is produced by reacting (a) an aminosilane compound of formula (1) or a hydrolysate thereof with (b) an ultraviolet absorber having in its molecules a carboxyl group in the presence of a silane compound having in its molecules an epoxy group and/or a colloidal silica so as to form an amide bond derived from the aminosilane compound or a hydrolysate thereof or by adding a silane compound having in its molecules an epoxy group and/or a colloidal silica to a reaction product obtained by reacting (a) an aminosilane compound of formula (1) or a hydrolysate thereof with (b) an ultraviolet absorber having in its molecules a carboxyl group so as to form an amide bond derived from the aminosilane compound or the derivative thereof, said formula (1) being represented by

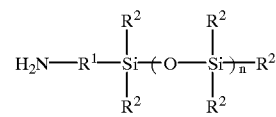

(1)

wherein $R^1$ is a $C_1$–$C_{10}$ alkylene group or a divalent group of the formula —$(CH_2)m$—NH— in which m is an integer of 1–4, $R^2$ are the same or different and each is selected from the group consisting of a hydrogen atom, a hydroxyl group, a halogen atom, a $C_1$–$C_{10}$ alkyl group and a $C_1$–$C_{10}$ alkoxy group provided that at least one of $R^2$ is an alkoxy group, and n is an integer of 0 or greater.

4. An ultraviolet absorbing plate according to claim 1 wherein said substrate and said ultraviolet absorbing layer are transparent.

5. An ultraviolet absorbing plate according to claim 1 wherein said substrate comprises a plurality of transparent substrate laminated one after another and one or more said ultraviolet absorbing layer disposed therebetween.

6. An ultraviolet absorbing plate according to claim 1 which has an overcoat layer on said ultraviolet absorbing layer.

7. An ultraviolet absorbing plate according to claim 1 which has a transparent electrically conductive layer on the side where said ultraviolet absorbing layer is disposed.

8. An ultraviolet absorbing plate according to claim 7 which has an overcoat layer between said ultraviolet absorbing layer and said transparent electrically conductive layer.

9. The ultraviolet absorbing plate according to claim 1, wherein the ultraviolet absorber is a benzotriazole molecule or a benzophenone molecule.

10. An ultraviolet absorbing material comprising a reaction product of (a) an aminosilane compound of formula (I) or a hydrolysate thereof with (b) an ultraviolet absorber having in its molecules a carboxyl group so as to form an amide bond derived from the aminosilane compound or a hydrolysate thereof, said formula (1) being represented by

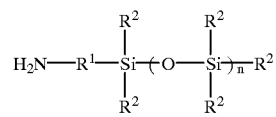

(1)

wherein $R^1$ is a $C_1$–$C_{10}$ alkylene group or a divalent group of the formula —$(CH_2)$m—NH— in which m is an integer of 1–4, $R^2$ are the same or different and each is selected from the group consisting of a hydrogen atom, a hydroxyl group, a halogen atom, a $C_1$–$C_{10}$ alkyl group and a $C_1$–$C_{10}$ alkoxy group provided that at least one of $R^2$ is an alkoxy group, and n is an integer of 0 or greater.

11. The ultraviolet absorbing material according to claim 10, wherein the ultraviolet absorber is a benzotriazole molecule or a benzophenone molecule.

\* \* \* \* \*